(12) United States Patent
O'Brien et al.

(10) Patent No.: US 8,833,324 B2
(45) Date of Patent: Sep. 16, 2014

(54) INERTIA ASSISTED ENGINE CRANKING

(75) Inventors: John P. O'Brien, Columbus, IN (US); David M. Barnes, Columbus, IN (US)

(73) Assignee: Cummins Inc., Columbus, IN (US)

( * ) Notice: Subject to any disclaimer, the term of this patent is extended or adjusted under 35 U.S.C. 154(b) by 938 days.

(21) Appl. No.: 12/924,585

(22) Filed: Oct. 1, 2010

(65) Prior Publication Data

US 2012/0080002 A1 Apr. 5, 2012

(51) Int. Cl.
| | | |
|---|---|---|
| B60K 6/10 | (2006.01) | |
| F02N 5/04 | (2006.01) | |
| B60K 6/48 | (2007.10) | |
| F02N 11/00 | (2006.01) | |
| B60K 25/00 | (2006.01) | |
| B60K 25/02 | (2006.01) | |

(52) U.S. Cl.
CPC ............ *B60K 6/48* (2013.01); *B60K 2025/005* (2013.01); *F02N 5/04* (2013.01); *B60K 25/00* (2013.01); *Y02T 10/6221* (2013.01); *F02N 11/003* (2013.01); *F02N 11/00* (2013.01); *B60K 2025/022* (2013.01); *F02N 11/006* (2013.01)
USPC .................................. 123/179.22; 123/179.3

(58) Field of Classification Search
CPC ............ B60K 25/00; B60K 2025/005; B60K 2025/022; B60W 10/04; B60W 10/06; B60W 10/08; B60W 10/30; F02N 5/04
USPC ............... 123/179.22, 198 R, 179.3; 701/113
See application file for complete search history.

(56) References Cited

U.S. PATENT DOCUMENTS

| | | | |
|---|---|---|---|
| 4,126,200 A | 11/1978 | Miller et al. | |
| 4,405,031 A | 9/1983 | Rotter | |
| 4,458,156 A | 7/1984 | Maucher et al. | |
| 4,489,242 A | 12/1984 | Worst | |
| 4,502,429 A * | 3/1985 | Ebihara | 123/179.22 |
| 4,626,696 A | 12/1986 | Maucher et al. | |
| 5,132,604 A * | 7/1992 | Shimane et al. | 322/10 |
| 5,176,581 A | 1/1993 | Kumm | |
| 5,285,111 A | 2/1994 | Sherman | |
| 5,845,731 A | 12/1998 | Buglione et al. | |
| 5,865,263 A | 2/1999 | Yamaguchi et al. | |
| 6,032,632 A | 3/2000 | Bolenz et al. | |
| 6,098,584 A | 8/2000 | Ahner et al. | |
| 6,848,552 B2 * | 2/2005 | Miller | 192/45.018 |
| 7,013,646 B1 * | 3/2006 | Serkh et al. | 60/698 |
| 7,021,271 B2 * | 4/2006 | Kitamura et al. | 123/198 R |

(Continued)

FOREIGN PATENT DOCUMENTS

| | | |
|---|---|---|
| JP | 58-098658 | 11/1983 |
| JP | 2007-032494 | 8/2007 |

OTHER PUBLICATIONS

International Searching Authority. International Search Report and Written Opinion of the International Searching Authority. PCT Patent Application No. PCT/US2011/01714. Feb. 14, 2012.

*Primary Examiner* — Hieu T Vo
*Assistant Examiner* — Arnold Castro
(74) *Attorney, Agent, or Firm* — Krieg DeVault LLP

(57) ABSTRACT

An inertia assisted engine starting apparatus and method are disclosed. The apparatus includes an internal combustion engine and an accessory drive system including an accessory. The accessory includes a rotatable member. An electric motor is selectively rotationally coupled to the accessory drive system. A mechanical coupling device selectively transfers rotational kinetic energy from the accessory drive system to start the internal combustion engine.

25 Claims, 5 Drawing Sheets

(56) References Cited

U.S. PATENT DOCUMENTS

| | | | |
|---|---|---|---|
| 7,024,858 B2 | 4/2006 | Gray Jr. | |
| 7,099,768 B2* | 8/2006 | Moriya | 701/112 |
| 7,107,960 B1* | 9/2006 | Ursu et al. | 123/185.9 |
| 7,114,585 B2 | 10/2006 | Man et al. | |
| 7,188,020 B2 | 3/2007 | Yasui et al. | |
| 7,303,504 B2 | 12/2007 | Uchisasai et al. | |
| 7,392,871 B2 | 7/2008 | Severinsky et al. | |
| 7,455,134 B2 | 11/2008 | Severinsky et al. | |
| 7,506,711 B2* | 3/2009 | Usoro | 180/65.23 |
| 7,520,353 B2 | 4/2009 | Severinsky et al. | |
| 7,540,346 B2 | 6/2009 | Hu | |
| 7,582,034 B2* | 9/2009 | Usoro | 475/5 |
| 7,695,400 B2* | 4/2010 | McGee | 477/5 |
| 7,726,275 B2* | 6/2010 | Deniston et al. | 123/198 R |
| 8,166,945 B2* | 5/2012 | Spicer et al. | 123/179.28 |
| 2003/0116368 A1* | 6/2003 | Winkelman et al. | 180/65.2 |
| 2003/0160455 A1 | 8/2003 | Hu et al. | |
| 2003/0221656 A1* | 12/2003 | Kitamura et al. | 123/198 R |
| 2004/0206594 A1* | 10/2004 | Miller | 192/45 |
| 2005/0022770 A1* | 2/2005 | Yumiyama et al. | 123/179.4 |
| 2006/0019786 A1* | 1/2006 | Asa et al. | 475/5 |
| 2006/0107920 A1* | 5/2006 | Serkh et al. | 123/198 R |
| 2006/0174624 A1* | 8/2006 | Grabowski et al. | 60/709 |
| 2007/0068476 A1* | 3/2007 | Asada | 123/179.24 |
| 2007/0080037 A1* | 4/2007 | Larry et al. | 192/21.5 |
| 2007/0130950 A1* | 6/2007 | Serkh et al. | 60/698 |
| 2007/0186896 A1* | 8/2007 | Carroll et al. | 123/198 R |
| 2007/0213151 A1* | 9/2007 | Usoro | 474/87 |
| 2008/0020875 A1* | 1/2008 | Serrels et al. | 474/70 |
| 2008/0110683 A1 | 5/2008 | Serkh | |
| 2008/0149405 A1* | 6/2008 | Hladun et al. | 180/53.8 |
| 2008/0257311 A1 | 10/2008 | Spicer et al. | |
| 2009/0255741 A1* | 10/2009 | Major et al. | 180/65.22 |
| 2009/0298646 A1 | 12/2009 | Parsons | |
| 2010/0065001 A1 | 3/2010 | Spicer et al. | |
| 2010/0147646 A1 | 6/2010 | Lannutti et al. | |

* cited by examiner

INERTIA ASSISTED ENGINE CRANKING

BACKGROUND

Environmental concerns and limited natural resources are highlighting the desire for reduced fuel consumption. One promising avenue toward the reduction of fuel consumption is the use of hybrid powertrains. Many hybrid applications utilize a start/stop function to eliminate engine idle operation. The start/stop function requires more durable and expensive starting components due to the increased number of starts throughout the life of the engine. The starting process of an internal combustion engine requires a significant amount of energy. Therefore, to increase efficiency and reduce production costs, further technological developments are desirable in this area.

SUMMARY

One embodiment of the application is a unique apparatus and method for harnessing kinetic energy to be utilized to start an internal combustion engine. Further embodiments, forms, objects, features, advantages, aspects, and benefits shall become apparent from the following description and drawings.

DESCRIPTION OF THE ILLUSTRATIVE EMBODIMENTS

Figure 1:
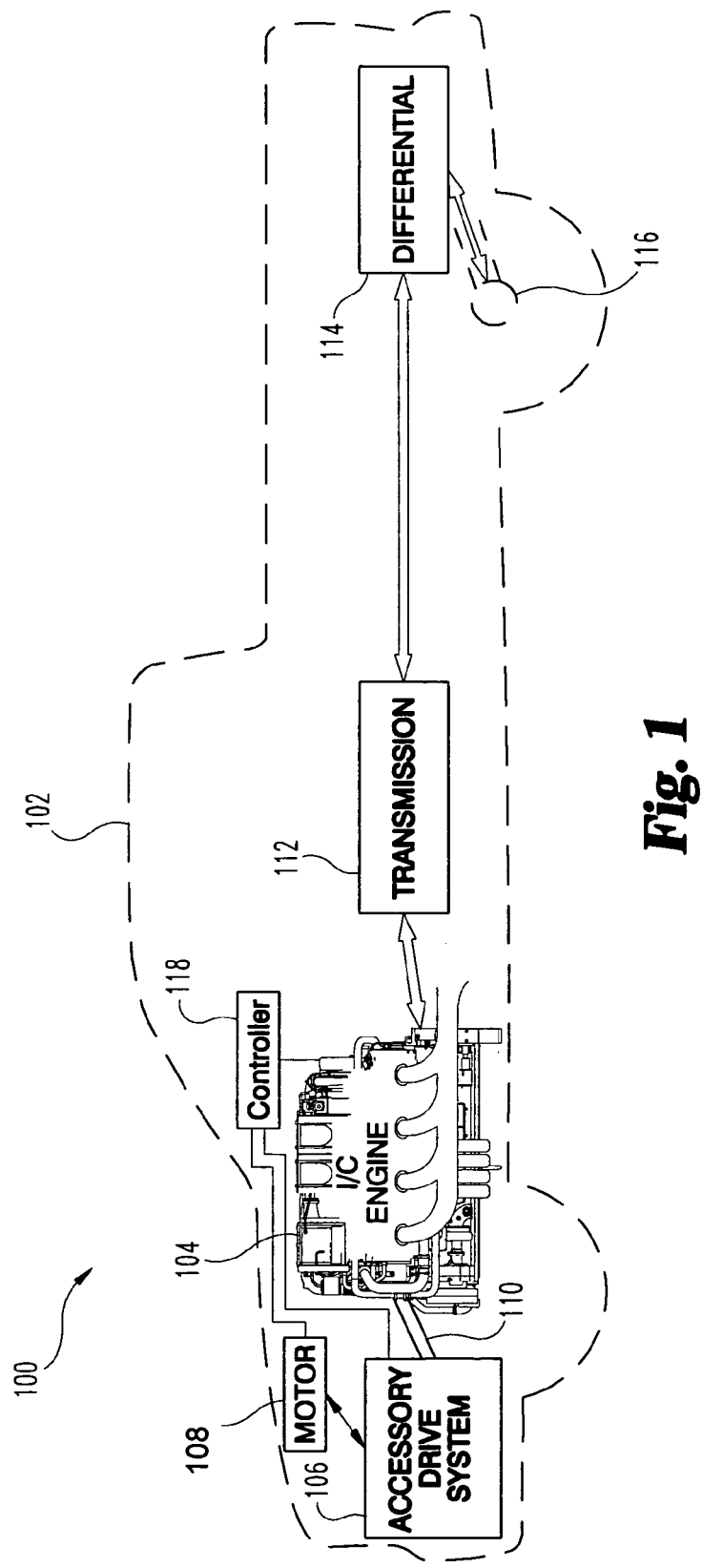
FIG. 1 is a schematic illustration of one embodiment of an inertia assisted engine cranking apparatus.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is one embodiment of an inertia assisted engine cranking system 100. The system 100 includes a motor 108 operatively coupled to an accessory drive system 106. The accessory drive system 106 is operatively coupled to an internal combustion engine 104 by a mechanical coupling device 110. The internal combustion engine 104 is mechanically coupled to a transmission 112 which in turn is mechanically coupled to a differential 114 operable to drive an axle 116 of a vehicle 102.

The accessory drive system 106 can be powered by the motor 108 when the internal combustion engine 104 is off. When the internal combustion engine 104 is to be started, the mechanical coupling device 110 selectively transfers rotational kinetic energy stored in the accessory drive system 106 to start or aid in the starting of the internal combustion engine 104. The motor 108 may provide additional energy to aid in starting the internal combustion engine 104 should the accessory drive system 106 lack sufficient rotational kinetic energy to start the internal combustion engine 104. The electric motor 108 can be an asynchronous motor generator, an induction motor, a synchronous motor generator or any type of motor capable of powering the accessory drive system 106 and in some applications of generating energy.

In certain embodiments, the system 100 further includes a controller 118 structured to perform certain operations. Controller 118 may be in communication with at least one of the motor 108, the internal combustion engine 104, and the accessory drive system 106. In one specific embodiment, the controller 118 is part of the ECU of internal combustion engine 104 and is in communication with the internal combustion engine 104, the accessory drive system 106, as well as the motor 108. In certain embodiments, the controller forms a portion of a processing subsystem including one or more computing devices having memory, processing, and communication hardware. The controller may be a single device or a distributed device, and the functions of the controller may be performed by hardware or software.

Figure 2:
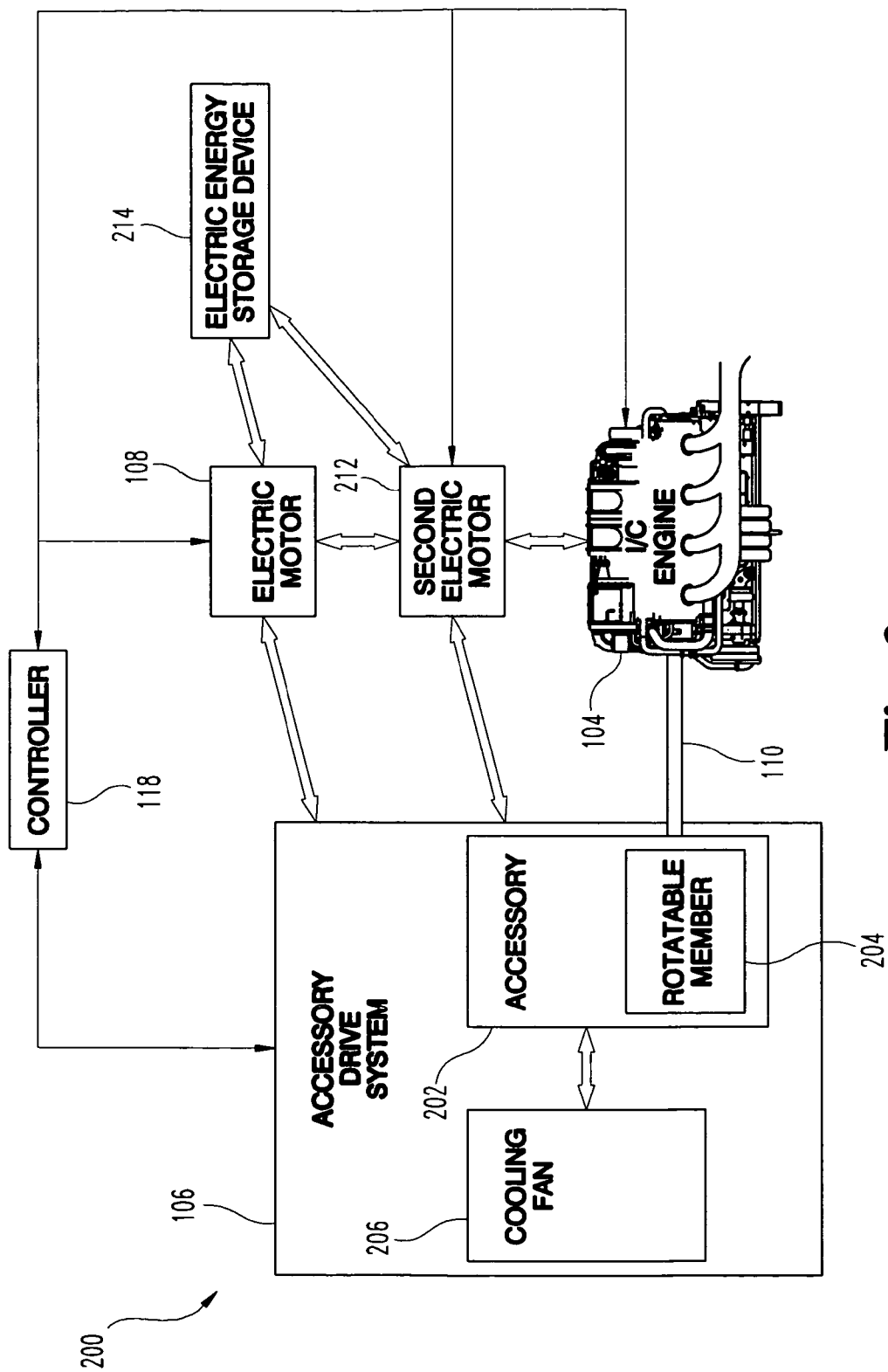
FIG. 2 is a schematic illustration of one embodiment of a component view of an inertia assisted engine cranking apparatus.

FIG. 2 is a schematic illustration of a component view of an inertia assisted engine cranking apparatus of one embodiment of the present invention. The system 200 includes an accessory drive system 106 including an accessory 202. The accessory 202 includes a rotatable member 204. The electric motor 108 is operable to power the accessory drive system 106 using an electric energy storage device 214 as a source of power. The mechanical coupling device 110 is operable to mechanically connect the accessory drive system 106 and the internal combustion engine 104. The second electric motor 212 may provide mechanical power to the internal combustion engine 104 and/or the accessory drive system 106 to aid in starting the internal combustion engine 104. The second electric motor 212 may also use the electric energy storage device 214 as a source of power.

The electric motor 108 can be operable to power the accessory drive system 106 when the internal combustion engine 104 is off. The electric motor 108 can also partially drive the accessory drive system 106 during engine operation should it be more efficient or convenient to drive accessories 202 electrically. The accessory drive system 106 can be completely powered by internal combustion engine 104 during engine operation through mechanical coupling device 110. The electric motor 108 can be a motor/generator capable of providing torque assist to the internal combustion engine 104 and can be capable of absorbing regenerative braking energy to charge the electric energy storage device 214.

To start the internal combustion engine 104, kinetic energy from the rotatable member 204, located inside accessories 202, will be harnessed. The rotatable member 204 of an accessory 202 can be any rotatable device capable of storing kinetic energy. The kinetic energy stored in the electric motor 108 can be utilized in combination with the kinetic energy of the accessories 202 to start or aid in starting internal combustion engine 104. The accessories 202 in the accessory drive system 106 may include a cooling fan 206, a HVAC refrigerant compressor, an engine coolant pump, an air pump, an alternator, various pulleys, and other accessories capable of being included into a front end accessory drive (FEAD) as are commonly used in the automotive and industrial machinery industries. In some applications, the inertia of the electric motor 108 may be larger than that of the accessories 202 of the accessory drive system 106 and, therefore, may be the primary source of kinetic energy to start or aid in starting the internal combustion engine 104. The controller 118 can be in communication with the electric motor 108, the second electric motor 212, the accessory drive system 106, and the internal combustion engine 104. The controller 118 may be a subcomponent of the ECU or it may be a stand alone controller.

The internal combustion engine 104 can be a diesel engine, a natural gas engine, a gasoline engine, or any other internal combustion engine known to one of skill in the art. The internal combustion engine 104 is selectively connected to the accessory drive system 106 through a mechanical coupling device 110. The mechanical coupling device 110 allows select connectivity between the internal combustion engine 104 and the kinetic energy of the accessories 202 as well as the kinetic energy of electric motor 108. The mechanical coupling device 110 can be a slip clutch, an on-off type clutch, a transmission, or any type of mechanical or hydraulic device capable of coupling and decoupling the internal combustion engine 104 to the accessory drive system 106. The second electric motor 212 can be selectively connected to the internal combustion engine 104 and/or to the accessory drive system 106 to provide additional torque to start the engine. The second electric motor 212 can be a starter motor; however, any type of motor capable of providing additional torque to the internal combustion engine 104 directly, or indirectly through the accessory drive system 106, can be utilized. Furthermore, the second electric motor 212 can be a motor/generator capable of aiding to charge the electric energy storage device 214.

In one embodiment of the present application, through the use of the combined inertia of the accessory drive system 106 and the electric motor 108, the size of the electric motor 108 can be decreased relative to the size of typical starter motors commonly used in start/stop hybrid applications. By reducing torque requirements on the electric starting motor, this application can provide quick start-ups with low noise, vibration, and harshness (NVH).

In certain embodiments, the controller 118 includes one or more modules structured to functionally execute the operations of the controller 118. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. Interpreting a data value includes, without limitation, reading the value from a memory location, receiving the value over a datalink, receiving the value as a physical value (e.g. a voltage reading from a sensor), and/or calculating the value from one or more other parameters.

Figure 3:
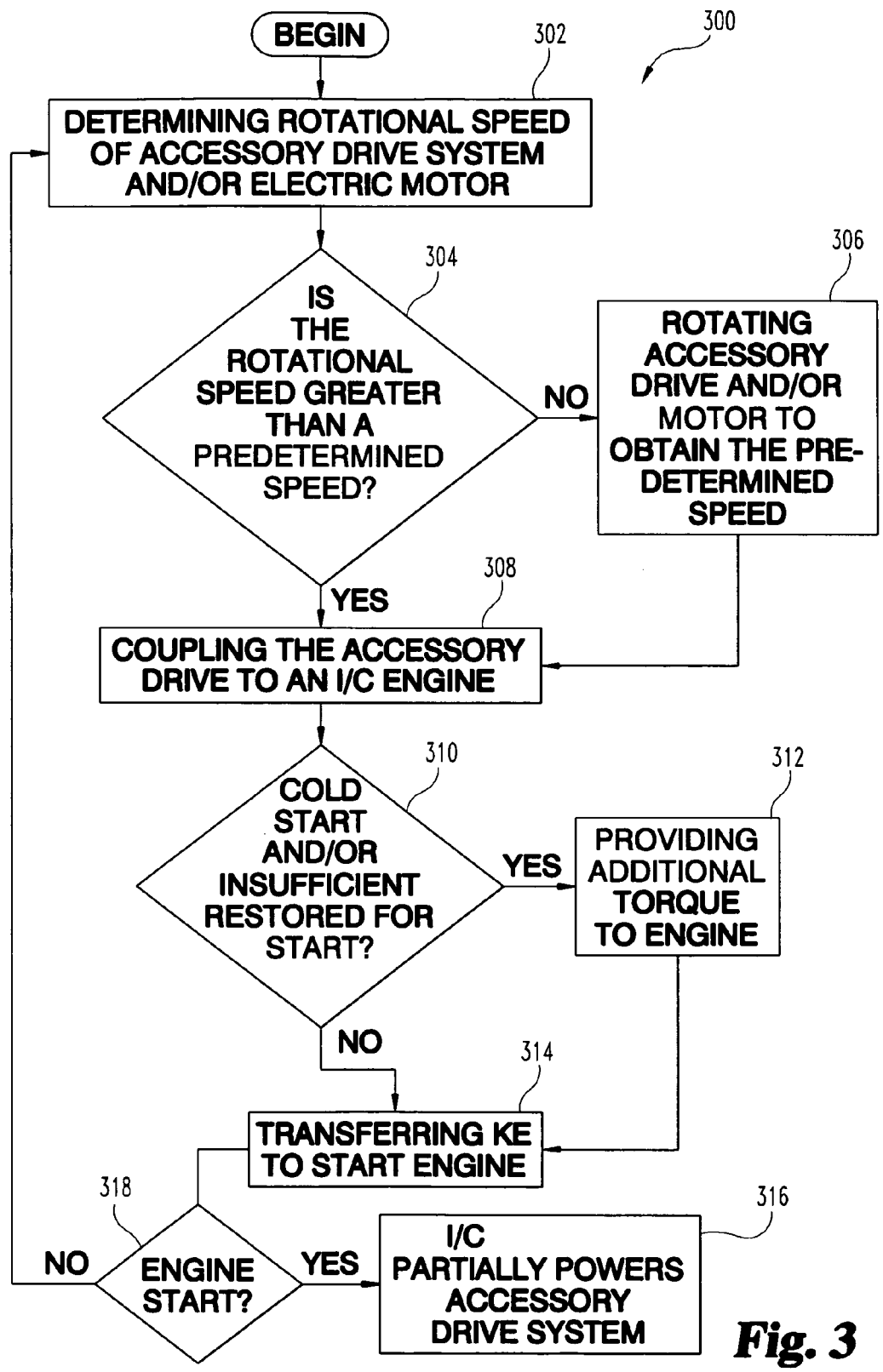
FIG. 3 is a schematic flowchart of a procedure for utilizing inertia to start an internal combustion engine.

FIG. 3 is a schematic flowchart of a procedure for utilizing inertia to start an internal combustion engine. The procedure 300 can begin by a module 302 determining the rotational speed of the accessory drive system and/or the electric motor. An operation 304 determines if the rotational speed of the accessory drive system and/or the rotational speed of the electric motor is greater than a predetermined speed. The predetermined speed can be a speed at which there is sufficient kinetic energy stored to start the engine, a speed at which the accessories are being powered efficiently, a speed at which enough kinetic energy is stored to allow the size of the starting motor to be decreased in size, or any other speed determined to be desirable. A module 306 rotates the accessory drive system and/or electric motor to obtain the predetermined speed if the operation 304 has determined that the rotational speed is not greater than a predetermined speed. After the predetermined speed of the accessory drive has been met, a module 308 couples the accessory drive to an internal combustion engine. An operation 310 determines if there is sufficient kinetic energy stored in the accessory drive to start the internal combustion engine as well as if the internal combustion engine is performing a cold start. Some examples of a cold start scenario are if the engine oil or coolant approximates ambient temperature; however, various other techniques including engine run time can be utilized to determine a cold start. Should the operation 310 make a determination that there is not sufficient kinetic energy, or that a cold start situation is present, a module 312 can provide additional torque to the internal combustion engine. If the operation 310 determines there is sufficient kinetic energy to start the internal combustion engine or if the module 312 has provided additional torque to the engine, a module 314 will transfer the kinetic energy from the accessory drive system to start the engine. An operation 318 then makes a determination of whether the internal combustion engine started. If the internal combustion engine started, the module 316 may at least partially power the accessory drive system with energy from the internal combustion engine should it be more efficient to do so; otherwise, the electric motor will continue to power the accessory drive system. The internal combustion engine may provide a portion of the power to the accessory drive system with aid from the motor should that configuration be more efficient or more desirable.

Figure 4:
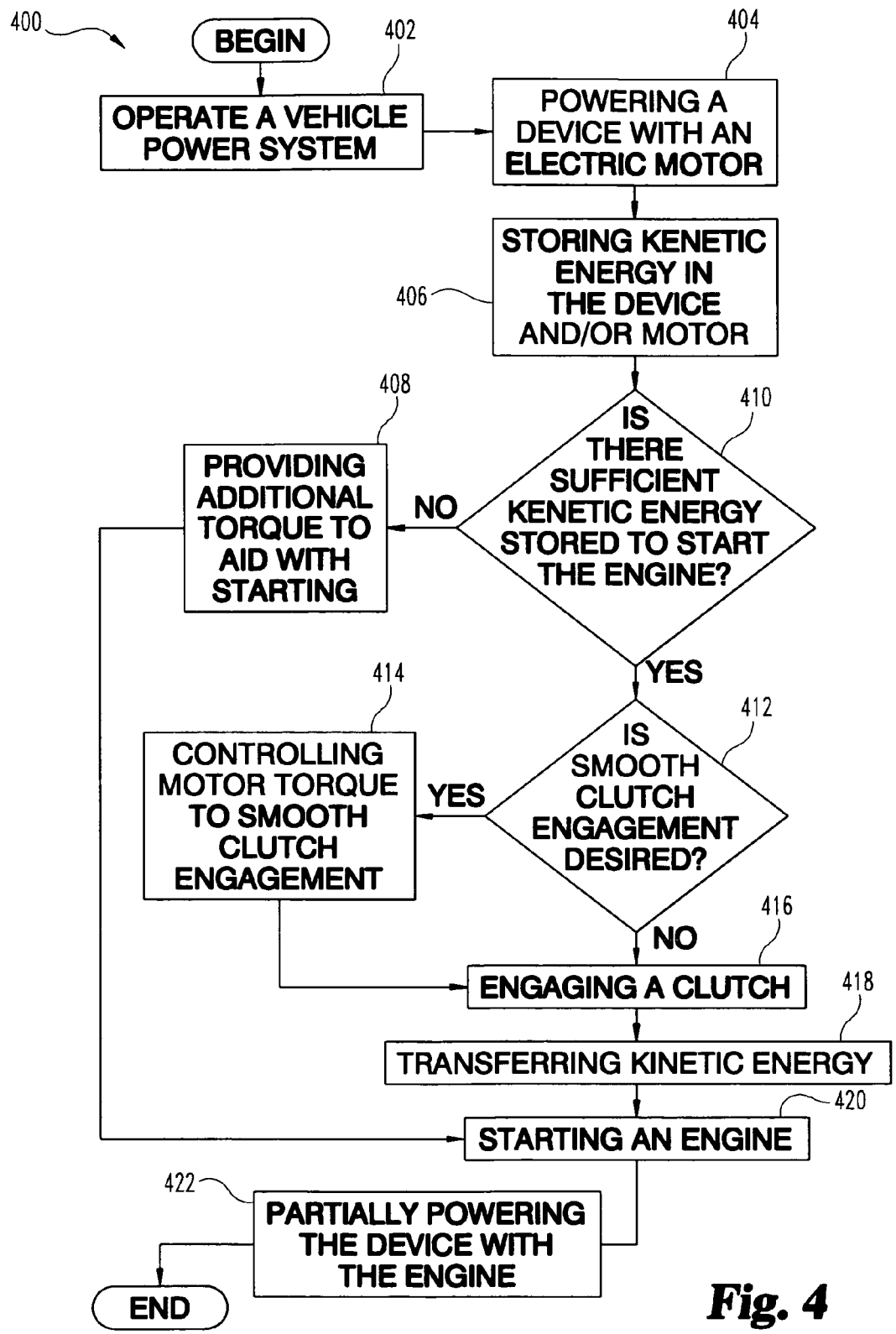
FIG. 4 is a schematic flowchart of another procedure for utilizing inertia to start an internal combustion engine.

FIG. 4 is a schematic flowchart of another procedure for utilizing inertia to start an internal combustion engine. A procedure 400 begins with a module 402, operating a vehicle power system. A module 404 powers a device with an electric motor. A module 406 stores kinetic energy in the device and/or the electric motor. An operation 410 determines if there is sufficient kinetic energy stored to start the engine. Should the operation 410 determine there is insufficient kinetic energy stored to start the engine, a module 408 can provide additional torque to the engine to aid in starting. An operation 412 determines whether smooth clutch engagement is desired. Should smooth clutch engagement be desired, a module 414 controls motor torque to smooth clutch engagement. A module 416 engages a clutch operable to transfer stored kinetic energy to the engine. A module 418 transfers kinetic energy from the accessory drive system to the engine. A module 420 starts the engine either solely with the stored kinetic energy or with stored kinetic energy and additional motor torque as provided by module 408. Once the engine is started, a module 422 may partially power the device with the engine through a mechanical coupling device.

Figure 5:
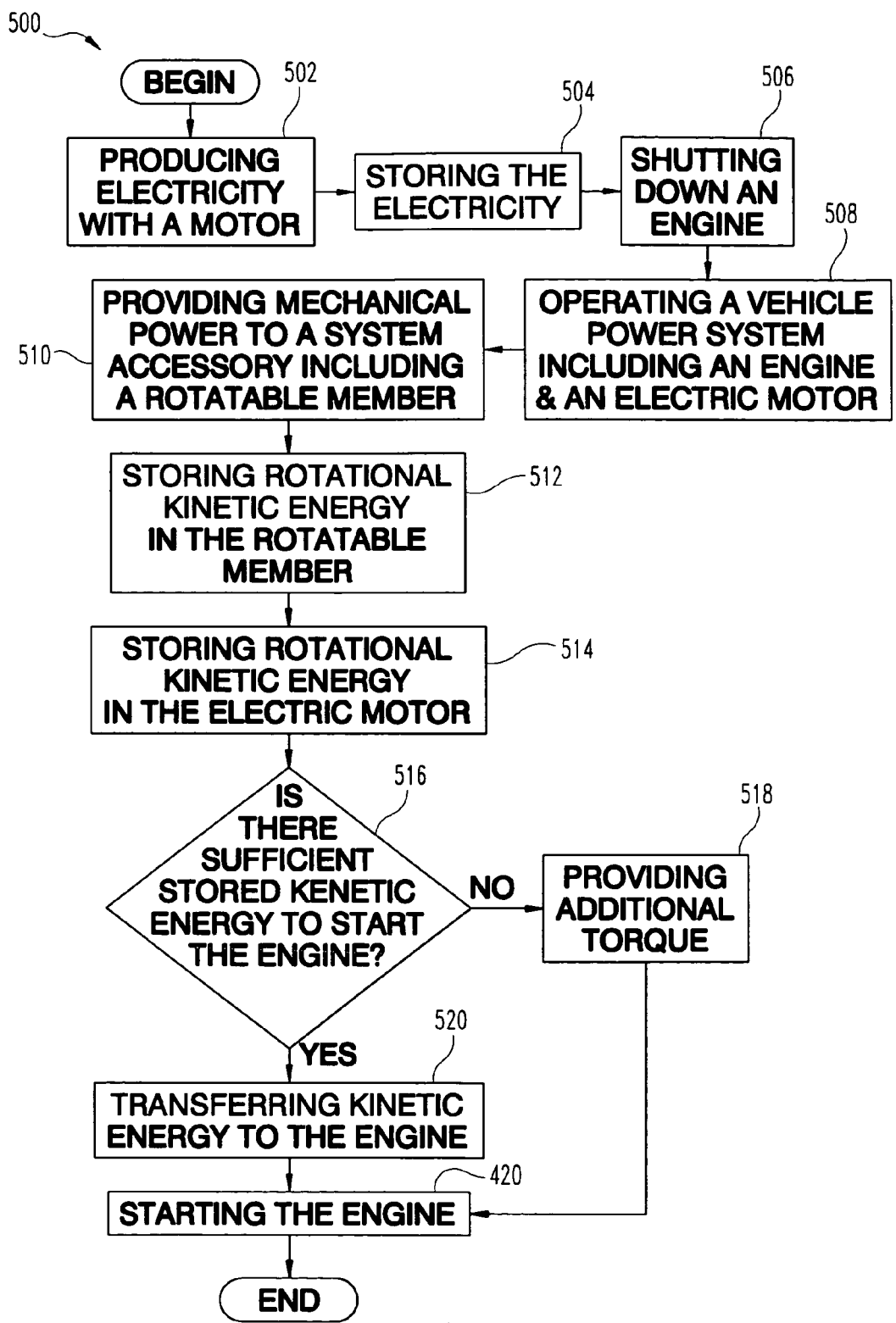
FIG. 5 is a schematic flowchart of yet another procedure for utilizing inertia to start an internal combustion engine.

FIG. 5 is a schematic flowchart of yet another procedure for utilizing inertia to start an internal combustion engine. A procedure 500 can begin by a module 502 producing electricity with a motor/generator. A module 504 can store the electric energy produced by the module 502. A module 506 is operable to shut down an engine. A module 508 operates a vehicle power system including an engine and an electric motor. A module 510 provides mechanical power to a system accessory including a rotatable member. A module 512 stores rotational kinetic energy in the rotatable member. A module 514 is operable to store rotational kinetic energy in the electric motor. An operation 516 determines if there is sufficient kinetic energy stored to start the engine. A module 518 provides additional torque to the engine if the operation 516 has determined that there is insufficient kinetic energy stored to start the engine. A module 520 transfers the stored kinetic energy to the engine. The module 420 is operable to start the engine through the transferred kinetic energy from the module 520 or with kinetic energy and the additional torque provided by the module 518.

In one embodiment of the present application, for a hot start (e.g. the internal combustion engine oil and/or coolant approximates normal operational temperature) the internal combustion engine is running. A supervisory controller commands the internal combustion engine to shut down. The command to shut down can be sent after a fixed or variable amount of engine idle time or in other circumstances deemed desirable to increase efficiency. A slip clutch between the internal combustion engine and an accessory drive system is opened as a motor takes on the accessory drive system load while fuel is cut off to the internal combustion engine and the engine is spinning down. During engine off operation, the motor drives the accessory drive system. To avoid NVH, the slip clutch operation and motor control can be coordinated. To restart the internal combustion engine, the slip clutch is engaged and the motor begins producing additional torque. The internal combustion engine is spun up utilizing inertia transfer from the accessory drive system and the motor as well as the additional torque produced from the motor. When the internal combustion engine fires, it can take on the accessory load and may be aided by the motor should it be more efficient to use electric energy rather than mechanical energy to drive the accessory drive system.

In another embodiment of the present application, for a cold start (i.e. the internal combustion engine is being turned from a key off position) the internal combustion engine is stopped and a slip clutch connecting the internal combustion engine and the accessory drive system is open. When the engine is to be started, a motor spins the accessory drive system to a predetermined speed. The predetermined speed can be the operational speed of the accessory drive system. To avoid NVH slip clutch operation and motor control can be coordinated. When the accessory drive system has reached the predetermined speed, the slip clutch is engaged as the motor begins producing additional torque to aid in cranking the internal combustion engine. The internal combustion engine is spun up utilizing inertia transfer from the accessory drive system and the motor as well as the additional torque produced from the motor. When the engine fires, it can take on the accessory load and may be aided by the motor should it be more efficient to use electric energy rather than mechanical energy to drive the accessory drive system.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
    an internal combustion engine including a crankshaft;
    an accessory drive system including an accessory, the accessory including a rotatable member;
    a motor configured to selectively drive the accessory drive system effective to rotate the rotatable member;
    a mechanical coupling device configured to selectively transfer rotational kinetic energy from the accessory drive system to the crankshaft; and
    a controller operatively coupled with the mechanical coupling device and the motor;
    wherein the controller is configured to:
        couple the accessory drive system to the crankshaft;
        evaluate whether there is sufficient kinetic energy stored by the accessory drive system to start the engine; and
        if there is not sufficient kinetic energy stored by the accessory drive system to start the engine, control operation of the motor to increase torque provided to the crankshaft to start the engine;
        wherein the controller is operable to start the engine either solely with stored kinetic energy of the accessory drive system or with stored kinetic energy of the accessory drive system in combination with torque from operation of the motor.

2. The apparatus of claim 1, wherein the accessory is selected from the accessories consisting of: a coolant pump, a cooling fan, a compressor, and an engine alternator.

3. The apparatus of claim 1, wherein the electric motor provides further rotational kinetic energy concurrent with one or more accessories to start the internal combustion engine.

4. The apparatus of claim 1, further comprising a second electric motor to selectively provide rotational mechanical power to at least one of the accessory drive system and the internal combustion engine.

5. The apparatus of claim 1, further comprising an electric energy storage device to selectively provide electric power to the electric motor and wherein the electric motor is structured to selectively generate electric energy for storage by the electric energy storage device.

6. The apparatus of claim 5, wherein the electric motor is an asynchronous direct motor generator.

7. The apparatus of claim 1, wherein the internal combustion engine further comprises a diesel engine.

8. A method, comprising:
    determining the rotational speed of at least one of an accessory drive system and an electric motor;
    determining whether the rotational speed exceeds a predetermined speed;
    in response to the rotational speed exceeding a predetermined speed, coupling the accessory drive to an internal combustion engine;
    in response to the coupling, evaluating whether the kinetic energy is sufficient to start the engine and, if the kinetic energy is not sufficient to start the engine, operating the motor to increase the energy provided to start the engine;
    wherein the engine is started either with kinetic energy without energy from operation of the motor, or with kinetic energy in combination with energy from operation of the motor.

9. The method of claim 8, further comprising rotating at least one of the accessory drive system and the electric motor to obtain the predetermined speed.

10. The method of claim 8, further comprising transferring the kinetic energy in the electric motor to the internal combustion engine to start the internal combustion engine.

11. The method of claim 8, further comprising providing additional torque to start the internal combustion engine in the case of a cold start.

12. The method of claim 8, wherein the internal combustion engine at least partially powers the accessory drive system once the internal combustion engine is started.

13. The method of claim 8, further comprising selectively producing and storing electric energy from the electric motor.

14. A method, comprising:
operating a vehicle power system including an internal combustion engine, an electric motor, and a device, the device selected from the devices consisting of: a fan, a pump, a compressor, and an engine alternator;
powering the device with the electric motor;
storing kinetic energy in at least one of the electric motor and the device;
transferring the kinetic energy to the engine; and
evaluating whether the kinetic energy is sufficient to start the engine; and
if the kinetic energy is not sufficient to start the engine, operating the motor to increase the energy provided to start the engine;
wherein the engine is started either with kinetic energy without energy from operation of the motor, or with kinetic energy in combination with energy from operation of the motor.

15. The method of claim 14, wherein transferring at least a portion of the kinetic energy to start an internal combustion engine further comprises engaging a clutch.

16. The method of claim 14, further comprising controlling motor torque to smooth clutch engagement.

17. The method of claim 14, further comprising providing additional torque to start the internal combustion engine.

18. The method of claim 14, further comprising at least partially powering the device with the engine after engine startup.

19. An apparatus, comprising:
an internal combustion engine;
an accessory drive system including one or more accessories each including a rotatable member for storing rotational kinetic energy;
means for driving the accessory drive system;
means for transferring the kinetic energy to start the internal combustion engine;
a controller operatively coupled with the means for driving the accessory drive system and the means for transferring the rotational kinetic energy;
wherein the controller is configured to:
control the means for transferring the kinetic energy to provide stored rotational kinetic energy to turn the engine;
evaluate whether there is sufficient stored rotational kinetic energy to start the engine; and
if there is not sufficient stored rotational kinetic energy to start the engine, control operation of the means for driving the accessory system to increase torque provided to the crankshaft to start the engine;
wherein the controller is operable to start the engine either with stored rotational kinetic energy or with a combination of stored rotational kinetic energy and energy from operation of the means for driving the accessory drive system.

20. The apparatus of claim 19, wherein means for driving the accessory drive system provides rotational kinetic energy concurrent with the rotational kinetic energy from the one or more accessories to start the internal combustion engine.

21. The apparatus of claim 19, wherein means for storing rotational kinetic energy includes at least one of: a coolant pump, a cooling fan, a compressor, and an electric motor.

22. The apparatus of claim 19, wherein the means for driving the accessory drive system further comprises a selective motor/generator and an electric energy storage device.

23. The apparatus of claim 19, wherein the internal combustion engine is further equipped with means for a start/stop function.

24. The apparatus of claim 19, further comprising a means for starting under a cold start condition.

25. The apparatus of claim 19, further comprising a means to determine if a rotational speed exceeds a predetermined speed.

* * * * *